United States Patent
Li et al.

(10) Patent No.: US 10,500,594 B2
(45) Date of Patent: Dec. 10, 2019

(54) APPARATUS AND METHOD FOR CONTINUOUS PREPARATION OF CARBON NANOTUBES

(71) Applicant: Shandong Dazhan Nano Materials Co., LTD, Binzhou (CN)

(72) Inventors: Yan Li, Binzhou (CN); Sijiao Xu, Binzhou (CN); Zhenhua Lv, Binzhou (CN); Lei Geng, Binzhou (CN)

(73) Assignee: Shandong Dazhan Nano Materials Co., LTD, Zouping County, Binzhou (CN)

( * ) Notice: Subject to any disclaimer, the term of this patent is extended or adjusted under 35 U.S.C. 154(b) by 242 days.

(21) Appl. No.: 15/323,839

(22) PCT Filed: Jul. 31, 2015

(86) PCT No.: PCT/CN2015/085662
§ 371 (c)(1),
(2) Date: Jan. 4, 2017

(87) PCT Pub. No.: WO2016/008454
PCT Pub. Date: Jan. 21, 2016

(65) Prior Publication Data
US 2017/0144887 A1     May 25, 2017

(30) Foreign Application Priority Data

Jul. 17, 2014   (CN) .......................... 2014 1 0341544

(51) Int. Cl.
*B03C 1/00*     (2006.01)
*B01J 8/24*     (2006.01)
(Continued)

(52) U.S. Cl.
CPC ........ *B03C 1/00* (2013.01); *B01J 8/24* (2013.01); *B82B 3/00* (2013.01); *B82Y 40/00* (2013.01); *C01B 32/162* (2017.08)

(58) Field of Classification Search
CPC ......... B03C 1/00; C01B 32/158; C01B 32/16; C01B 32/162; B01J 8/24; B82B 3/00; B82Y 40/00
See application file for complete search history.

(56) References Cited

U.S. PATENT DOCUMENTS 8,052,875 B2 * 11/2011 Oder .................... B03C 1/0335
                                                    209/214
2009/0069450 A1 *  3/2009 Ibsen ....................... B01J 8/22
                                                    518/709
(Continued)

FOREIGN PATENT DOCUMENTS

CN        1800006 A     7/2006
CN      101121511 A     2/2008
(Continued)

OTHER PUBLICATIONS

Chen, Bo, et al. "One-pot, solid-phase synthesis of magnetic multiwalled carbon nanotube/iron oxide composites and their application in arsenic removal." Journal of colloid and interface science 434 (2014): 9-17.*

(Continued)

*Primary Examiner* — Richard M Rump
(74) *Attorney, Agent, or Firm* — Christopher & Weisberg, P.A.

(57) ABSTRACT

The disclosure discloses an apparatus for continuous preparation of carbon nanotubes, comprising a main reactor, a separator and a return pipe, wherein the main reactor comprises a raw gas inlet, a return feed inlet, a protective gas inlet and a reaction material outlet; the separator is fluid communicated with the reaction material outlet of the main (Continued)

reactor at a top of the separator; a magnetic separating unit is arranged in the top of the separator at a side proximal to the main reactor; a product outlet and a material recycling port are arranged at a bottom of the separator respectively; the product outlet is located at a side distal to the main reactor; the recycling port is located at a side proximal to the main reactor; one end of the return pipe is fluid communicated with the material recycling port of the separator, and the other end is fluid communicated with the return feed inlet of the main reactor; the apparatus further comprises a tail gas outlet. This apparatus can realize continuous production of carbon nanotubes with increased utility of catalyst and raw materials at decreased cost, suitable for large-scale industrial production.

10 Claims, 3 Drawing Sheets

(51) Int. Cl.
    *B82B 3/00*         (2006.01)
    *B82Y 40/00*      (2011.01)
    *C01B 32/162*    (2017.01)

(56) References Cited

U.S. PATENT DOCUMENTS

| | | |
|---|---|---|
| 2009/0169465 A1 | 7/2009 | Jang et al. |
| 2013/0017142 A1 | 1/2013 | Noda et al. |
| 2015/0059571 A1 | 3/2015 | Denton et al. |

FOREIGN PATENT DOCUMENTS

| | | | | |
|---|---|---|---|---|
| CN | 102502589 A | | 6/2012 | |
| CN | 102741162 A | | 10/2012 | |
| GB | 1506170 A | * | 4/1978 | ......... C21B 13/0033 |
| GB | 1506170 A | | 4/1978 | |
| JP | 57155307 A | | 9/1982 | |
| JP | 2009249247 A | | 10/2009 | |
| TW | 201406650 A | | 2/2014 | |
| WO | 2013158440 A1 | | 10/2013 | |

OTHER PUBLICATIONS

International Preliminary Report on Patentability dated Jan. 17, 2017, for corresponding International Application No. PCT/CN2015/085662; International Filing Date: Jul. 31, 2015 consisting of 8-pages.
European Search Report dated Aug. 25, 2017, for corresponding Application No. 15821376.9; Filing Date: Jul. 31, 2015 consisting of 9-pages.
J.G. Wiltshire, et al., Magnetic Separation of Fe Catalyst from Single-Walled Carbon Nanotubes in an Aqueous Surfactant Solution, Science Direct, Elsevier Ltd., Carbon 43, 2005, pp. 1151-1155.
Chinese Office Action dated Apr. 23, 2018 for corresponding Application No. 201410341544.4; Filing Date: Jul. 17, 2014, consisting of 7-pages.

* cited by examiner

APPARATUS AND METHOD FOR CONTINUOUS PREPARATION OF CARBON NANOTUBES

CROSS-REFERENCE TO RELATED APPLICATIONS

This application is a Submission under 35 U.S.C. § 371 for U.S. National Stage Patent Application of, and claims priority to, International Application Number PCT/CN2015/085662, filed Jul. 31, 2015, entitled "APPARATUS AND METHOD FOR CONTINUOUS PREPARATION OF CARBON NANOTUBES", which is related to and claims priority to Chinese Patent Application Number 201410341544.4, filed Jul. 17, 2014, the entire contents of both of which are hereby incorporated herein by reference.

TECHNICAL FIELD

The present disclosure relates to an apparatus and a method for continuous preparation of carbon nanotubes. The apparatus for continuous preparation of carbon nanotubes according to the present disclosure exhibits advantages of simple structure, easy operation, steady production of carbon nanotubes in a continuous way, increased utility of catalyst and raw material, and improved purity of a carbon nanotube product. It is suitable for large-scale industrial production at reduced cost.

BACKGROUND ART

A carbon nanotube possesses excellent physical and mechanical properties. The microstructure of a carbon nanotube may be viewed as a seamless hollow tube formed by rolling a graphite sheet. It has a very large aspect ratio, generally with a diameter in the range of 1-100 nm, and a length of several microns to over one hundred microns. A carbon nanotube shows superior dynamic and electric properties. It has a hardness comparable with that of diamond, and a Yang's modulus of about 1.8 TPa. Its tensile strength is about 200 GPa, 100 times higher than the strength of a steel, but its weight is only ⅙ to ⅐ of the weight of the latter. Meanwhile, the maximum elastic strain of a carbon nanotube is up to about 12%, and thus it is as flexible as a spring. A carbon nanotube has an electric conductivity up to ten thousand times that of copper, and its heat conductivity is very good as well. Owing to their superb properties, carbon nanotubes are expected to be used widely in a variety of fields such as nanoelectronic devices, catalyst supports, electrochemical materials, composite materials and the like.

Realization of production, particularly mass production of carbon nanotubes is a prerequisite for application of carbon nanotube technology, and it's also a bottle neck constraining industrialization of this technology. Low carbon alkanes, alkenes, alcohols and the like are the main carbon sources for preparation of carbon nanotubes, but larger molecular weight carbon sources such as cyclohexane, benzene, phenanthrene and the like can also be used. Low carbon sources favors splitting, but the cost is relatively high. Due to increasing market competition, more and more efforts have been devoted to studies on low cost heavy carbon sources. Zhang Jun, et al synthesized carbon nanotubes from crude paraffin as a carbon source using an explosion process, and tried coal tar and asphalt which were used as carbon sources to prepare carbon nanotubes [Coal Conversion, 33(1), 2010], but the resulting carbon nanotubes had a low purity of about 70%. Despite low cost, the use of heavy carbon sources generally requires a relatively complex preparation process with low purity carbon nanotubes produced.

Nowadays, a fluidized bed reactor is typically used in an apparatus for preparation of carbon nanotubes, wherein a carbon source is split to form carbon nanotubes in the presence of a catalyst. However, a traditional gas-solid fluidized bed has the following disadvantages: reaction efficiency is affected significantly by the density and particle size of a catalyst; if the density of the catalyst is too low, the density of the product thus obtained is also relatively low, and thus the product may be blown out of the reactor in a short time, leading to decreased utility of the catalyst due to the insufficient retention time. In addition, if a low gas velocity is chosen for extending the retention time, the carbon nanotube product tends to form agglomerates which may clog the reactor at the upper part of the reactor, easily resulting in difficulty in fluidization in the course of production, among others. A variety of methods have been tried in the prior art to modify a traditional fluidized bed for preparation of carbon nanotubes.

For example, Chinese Patent Application CN1327943A discloses a method for continuous preparation of carbon nanotubes on a fluidized bed, wherein carbon nanotubes were grown on a catalyst support via chemical vapor deposition in the fluidized bed while the fluidization state of the generated nanocarbon material under the influence of a gas stream was controlled. Though this method solved the fluidization problem in the system to some extent, the utility of the catalyst was still low. Additionally, unreacted raw material gas and $N_2$ were discharged directly through an exhaust system, leading to waste of raw material and pollution to environment, among others.

According to Chinese Patent CN 202519030U, a vacuum chamber and a collecting chamber were added to a fluidized reactor, wherein gaseous material that was not fully reacted was drawn out from the vacuum chamber after raw material reacted in a synthesis chamber and the resultants were moved into the vacuum chamber, and finally carbon nanotubes thus produced were collected in the collecting chamber. Albeit carbon nanotubes could be collected and isolated easily, the gaseous material drawn away was not recycled, so the utility of the raw material was low.

According to Chinese Patent CN 101475159B, a rotatory member was added to a fluidized bed reactor, wherein the rotator member included blades which rotated to prevent accumulation of a catalyst and reinforce fluidization, so as to increase reaction efficiency. This apparatus had a complicated structure and could not operate continually, unsuitable for scaled production.

According to Chinese Patent Application CN 101959793A, a support body was added into the inside of a fluidized bed, wherein gas paths of a certain width existed inside and around the support body, and a catalyst was loaded on the support body, so that fluidization was reinforced. This manner could provide relatively pure carbon tubes, but the reaction could not proceed continuously, and the efficiency was rather low.

According to Chinese Patent Application CN 102120570A, continuous production of carbon nanotubes was realized with the use of a series of reactors in tandem, but resulting in carbon nanotubes with a low purity of only about 90%.

According to Chinese Patent CN 100393616C, continuous production of carbon tubes was realized with the use of a tubular reactor. But the reactor was expensive, and the reaction state was difficult to control. So, it's not easy to be industrialized.

Despite all the improvements made to a traditional fluidized reactor, most of the technical solutions disclosed by the above references have disadvantages of low catalytic efficiency, low utility of raw material and inability of continuous operation, while the apparatus capable of continuous operation tend to be expensive, and produce a carbon nanotube product with low purity, frustrating realization of industrial production.

Therefore, there is still a need in the art to develop an apparatus capable of continuous preparation of carbon nanotubes, which shall has the advantages of simple structure, low cost, and ability to increase utility of catalyst and raw material. When this apparatus is used to prepare carbon nanotubes continuously, the resulting carbon nanotubes have the advantages of high purity and lower cost than those obtained by other methods. The product thus obtained has consistent quality, suitable to be produced industrially in large scale.

SUMMARY

The disclosure is aimed to provide an apparatus and a method for continuous production of carbon nanotubes, wherein the apparatus has the advantages of simple structure, low cost, easy operation, and high utility of raw material. It is capable of producing high purity carbon nanotubes, and suitable for industrial production in large scale.

Therefore, in one aspect of the disclosure, there is provided an apparatus for continuous preparation of carbon nanotubes, comprising:

(a) a main reactor, comprising a raw gas inlet, a return feed inlet, a protective gas inlet and a reaction material outlet;

(b) a separator in fluid communication with the reaction material outlet of the main reactor at a top of the separator, wherein a magnetic separating unit is arranged in the top of the separator at a side proximal to the main reactor, wherein a product outlet and a material recycling port are arranged at a bottom of the separator respectively, wherein the product outlet is located at a side distal to the main reactor, and the recycling port is located at a side proximal to the main reactor; and (c) a return pipe and a feedback device arranged on the return pipe, wherein one end of the return pipe is fluid communicated with the material recycling port of the separator, and the other end is fluid communicated with the return feed inlet of the main reactor;

wherein the apparatus further comprises a tail gas outlet.

In a preferred embodiment of the disclosure, a barrier is arranged above the magnetic separating unit.

In a preferred embodiment of the disclosure, the top of the separator is fluid communicated with the reaction material outlet of the main reactor at a position between ⅓ of the main reactor from bottom and the top of the main reactor, preferably between ½ of the main reactor and the top of the main reactor.

In a preferred embodiment of the disclosure, the main reactor is a fluidized bed reactor.

In a preferred embodiment of the disclosure, the feedback device is a Venturi injector, a high temperature fan or a high temperature compressor.

In a preferred embodiment of the disclosure, the Venturi injector is arranged at a joint of the return pipe and the main reactor, or on the return pipe outside of the main reactor, or inside the main reactor.

In a preferred embodiment of the disclosure, the raw gas inlet, the return feed inlet and the protective gas inlet are arranged at a plurality of levels inside the main reactor and/or at a plurality of points at the same level, thereby facilitating fluidized reaction and heat conduction.

In a preferred embodiment of the disclosure, the protective gas inlet and the raw gas inlet are arranged separately or combined for feeding.

In a preferred embodiment of the disclosure, the tail gas outlet is arranged at the side of the separator, wherein the apparatus further comprises a fume barrier arranged in front of the tail gas outlet.

In a preferred embodiment of the disclosure, the tail gas outlet is arranged at the side of the main reactor, wherein the apparatus further comprises a fume barrier arranged in front of the tail gas outlet.

The apparatus according to the disclosure is suitable for catalytic splitting of a carbonaceous material with a magnetic catalyst to prepare carbon nanotubes.

In a preferred embodiment of the disclosure, a magnetic catalyst is used when the apparatus is used to prepare carbon nanotubes.

In another aspect of the disclosure, there is provided a method for continuous preparation of carbon nanotubes using an apparatus according to the disclosure, comprising:

1) providing a carbon source and a magnetic catalyst in a fluidized state to a main reactor, wherein the carbon source is split into carbon nanotubes by the action of the magnetic catalyst at a temperature of 600-1000° C.;

2) separating carbon nanotubes having a magnetic catalyst content of greater than X from carbon nanotubes having a magnetic catalyst content of less than X with a magnetic separating unit in a separator, wherein X is any value in a range of 0.5%-3%, wherein the magnetic catalyst content is based on the weight of carbon nanotubes formed;

3) delivering the separated carbon nanotubes having a magnetic catalyst content greater than X back to the main reactor through a feedback device on a return pipe to continue catalytic growth of carbon nanotubes.

In a preferred embodiment of the disclosure, the separator separates carbon nanotubes having a magnetic catalyst content of greater than 2.5% from carbon nanotubes having a magnetic catalyst content of less than 2.5%.

In a preferred embodiment of the disclosure, a carrier gas introduced in through a protective gas inlet has a flow rate of 0.5-300 m/s, preferably 5.0-200 m/s, more preferably 10-100 m/s; and a gas introduced in through a raw gas inlet has a flow rate of 0.2-300 m/s, preferably 1.0-200 m/s, more preferably 10-100 m/s. A gas in a fluidized bed has a flow rate of 0.01-10 m/s, preferably 0.05-5 m/s, more preferably 0.1-3 m/s.

In a preferred embodiment of the disclosure, the carbon source includes low carbon hydrocarbons containing 7 carbon atoms or less.

In a preferred embodiment of the disclosure, the carbon source includes heavy carbon sources in the form of anthracene oil and waste tyre oil, wherein the anthracene oil is a part of a coal tar composition and comprises anthracene, phenanthrene, acenaphthene and the like as main components; and the waste tyre oil is a fuel oil manufactured by pyrolysis of waste tyres, and comprises unsaturated hydrocarbons and benzene series as main components.

In a preferred embodiment of the disclosure, the magnetic catalyst is a catalyst containing iron, cobalt, nickel, or a transition metal, wherein the catalyst has a total content of iron, cobalt, nickel, or a transition metal of 1-50 wt %, preferably 2-40 wt %, more preferably 5-40%, based on the total weight of the catalyst.

BRIEF DESCRIPTION OF THE DRAWINGS

The disclosure will be illustrated with reference to the following drawings, in which.

DETAILED DESCRIPTION

An apparatus for continuous preparation of carbon nanotubes according to the disclosure comprises: (a) a main reactor comprising a raw gas inlet, a return feed inlet, a protective gas inlet and a reaction material outlet; (b) a separator in fluid communication with the reaction material outlet of the main reactor at a top of the separator, wherein a magnetic separating unit is arranged in the top of the separator at a side proximal to the main reactor, wherein a product outlet and a material recycling port are arranged at a bottom of the separator respectively, wherein the product outlet is located at a side distal to the main reactor, and the recycling port is located at a side proximal to the main reactor; and (c) a return pipe, wherein one end of the return pipe is fluid communicated with the material recycling port of the separator, and the other end is fluid communicated with the return feed inlet of the main reactor; and the apparatus further comprises a tail gas outlet.

Specific parts of the apparatus for continuous preparation of carbon nanotubes will be described as follows.

(1) Main Reactor

In the disclosure, a main reactor refers to a reactor for preparation of carbon nanotubes using a magnetic catalyst to split a carbon source catalytically. In this reactor, a carbon source grows into carbon nanotubes on a catalyst support by the action of a catalyst at an appropriate temperature, for example, 500-1000° C., preferably 600-900° C., more preferably 650-800° C.

In the disclosure, the type of the main reactor is not limited particularly, with the proviso that it is a reactor suitable for preparation of carbon nanotubes. It can be a horizontal or vertical reactor. A suitable main reactor includes a fluidized bed reactor, a tube reactor or a helical reactor and the like for preparation of carbon nanotubes.

The main reactor of the disclosure comprises a raw gas inlet, a return feed inlet, a protective gas inlet and a reaction material outlet. A protective gas is fed from the protective gas inlet, and acts to fluidize a reaction material fed into the main reactor. So, the protective gas inlet is generally positioned near the raw gas inlet.

The reaction material outlet should ensure entry of the reaction material into a separator after full reaction. Hence, the reaction material outlet is generally located at a position between 1/3 of the main reactor from bottom and the top of the main reactor, preferably between 1/2 of the main reactor and the top of the main reactor.

The main reactor is communicated with a return pipe through the return feed inlet.

In an embodiment of the disclosure, the main reactor is a fluidized bed reactor. A raw gas intake pipe and a protective gas intake pipe can be arranged at the bottom of the main reactor, wherein the raw gas intake pipe is connected to the main reactor through the raw gas inlet, and the protective gas intake pipe is connected to the main reactor through the protective gas inlet located near the raw gas inlet.

In an embodiment of the disclosure, the protective gas inlet and the raw gas inlet are arranged separately.

In another embodiment of the disclosure, the protective gas inlet and the raw gas inlet are combined into one for feeding. When the protective gas inlet and the raw gas inlet are combined for feeding, only a raw gas intake pipe can be arranged, so that both a raw gas and a protective gas enter the main reactor from the raw gas inlet through the raw gas intake pipe.

In another embodiment of the disclosure, a man hole is arranged at a top of the reaction apparatus to facilitate observation and maintenance.

In other embodiments of the disclosure, the raw gas inlet position, the return feed inlet position and the protective gas inlet position can be arranged at a plurality of levels inside the main reactor and/or at a plurality of points at the same level, thereby facilitating fluidized reaction and heat conduction.

(2) Separator

In the disclosure, a separator refers to a device for separating carbon nanotubes having a lower content of a magnetic catalyst from carbon nanotubes having a higher content of the magnetic catalyst by means of a magnetic separating unit and gravity.

In the disclosure, "magnetic catalyst" refers to a catalyst containing a magnetic substance such as iron, cobalt, nickel or a transition metal commonly used in production of carbon nanotubes. Based on a total weight of the catalyst, the catalyst has a total content of iron, cobalt, nickel or a transition metal of 1-50 wt %, preferably 2-40 wt %, more preferably 5-40 wt %.

A top of the separator is fluid communicated with the reaction material outlet of the main reactor. A magnetic separating unit is arranged in the top of the separator at a side proximal to the main reactor. A product outlet and a material recycling port are arranged at the bottom of the separator respectively, wherein the product outlet is located at a side distal to the main reactor, and the recycling port is located at a side proximal to the main reactor.

In the disclosure, "fluid communication" means that a reaction material in a reaction apparatus is communicated with another reaction apparatus in a form of fluid in a fluidized state.

At a temperature of the main reactor, a carbon source gas envelopes a magnetic catalyst and grows into carbon nanotubes on the catalyst. As a catalytic reaction proceeds to a higher extent, more carbon nanotubes are grown on the catalyst, and less magnetic catalyst is contained in the carbon nanotubes. Such carbon nanotubes containing less catalyst are a desired product for industrial application. Conversely, at a lower extent of catalytic reaction, carbon nanotubes thus grown have a higher content of catalyst. Carbon nanotubes having a magnetic catalyst content of higher than 10% have a very narrow range of application, and need to be further recycled.

After the catalytic reaction, the reaction material in the main reactor includes carbon nanotubes generated in the presence of the catalyst, unreacted carbon source gas and the magnetic catalyst. The resulting carbon nanotubes in a fluidized state by the action of the gas can enter a separator in a fluid form through the reaction material outlet of the main reactor.

The material entering the separator includes unreacted carbon source gas and the carbon nanotubes formed, wherein the carbon nanotubes include carbon nanotubes having a high content of the magnetic catalyst and carbon nanotubes having a low content of the magnetic catalyst. A magnetic separating unit is arranged in a top of the separator at a side proximal to the main reactor, wherein the magnetic separating unit separates the carbon nanotubes having a high content of the magnetic catalyst from the carbon nanotubes having a low content of the magnetic catalyst that enter the separator.

In the separator, the magnetic separating unit separates carbon nanotubes having a magnetic catalyst content of greater than X from carbon nanotubes having a magnetic catalyst content of less than X, wherein X is any value in a range of 0.5%-3%, wherein the magnetic catalyst content is based on the weight of carbon nanotubes formed.

In light of the requirements of the practical application, the magnetic separating ability of the magnetic separating unit can be adjusted to regulate X to a specific value. In a specific embodiment of the disclosure, the separator separates carbon nanotubes having a magnetic catalyst content of greater than 2.5% from carbon nanotubes having a magnetic catalyst content of less than 2.5%.

A product outlet and a material recycling port are arranged at a bottom of the separator respectively, wherein the product outlet is located at a side distal to the main reactor, and the recycling port is located at a side proximal to the main reactor. As high purity carbon nanotubes contain less magnetic substance and thus are not affected by the magnetic separating unit, they fall down under gravity in the separator at a side distal to the main reactor, and are discharged from the separator through the product outlet. A fluid of low purity carbon nanotubes containing more magnetic catalyst changes direction when it passes by the magnetic separating unit, and flows to the material recycling port at a side proximal to the main reactor, through which it enters a feedback pipe and goes back to the main reactor again.

In an embodiment of the disclosure, the separator further comprises a barrier positioned above the magnetic separating unit, wherein the barrier allows the reaction material entering the separator to flow toward the bottom of the separator in a direction away from the main reactor.

(3) Return Pipe and Feedback Device Arranged on the Return Pipe

In the disclosure, a material recycling port of a separator is fluid communicated with a return feed inlet of a main reactor via a return pipe. One end of the return pipe is fluid communicated with the material recycling port of the separator, and the other end is fluid communicated with the return feed inlet of the main reactor. A feedback device is arranged on the return pipe to feed the material in need of further reaction from the separator to the main reactor.

In an embodiment of the disclosure, the feedback device includes a high temperature fan, a high temperature compressor or a Venturi injector arranged on the return pipe.

In a preferred embodiment of the disclosure, the feedback device is a high temperature fan or a high temperature compressor. Carbon nanotubes containing a high level of a magnetic catalyst are delivered back to the main reactor by the driving force of the high temperature fan or high temperature compressor itself. In the case that a feedback device having its own driving force such as a high temperature fan and the like is used, the raw gas inlet and the protective gas inlet can be combined into one.

In a preferred embodiment of the disclosure, the feedback device is a Venturi injector. The use of a Venturi injector can take advantage of Venturi injection effect to deliver separated carbon nanotubes containing a high level of a magnetic catalyst back to the main reactor.

In a preferred embodiment of the disclosure, the Venturi injector is arranged at a joint of the return pipe and the main reactor.

In another preferred embodiment of the disclosure, the Venturi injector is arranged on the return pipe outside the main reactor.

In another preferred embodiment of the disclosure, the Venturi injector is arranged inside the main reactor.

In an example of the disclosure, the Venturi injector comprises an injecting gas inlet pipe, an injected gas inlet pipe and a gas outlet, wherein the injecting gas inlet pipe of the Venturi injector has a diameter of 15-200 mm, the injecting gas has a flow rate of 0.5-300 m/s; the injected gas inlet pipe has a diameter of 15-200 mm, and the injected gas has a flow rate of 0.5-200 m/s.

The reaction apparatus of the disclosure further comprises a catalyst feeding pipe through which a catalyst is fed into the reaction apparatus. The position of the catalyst feeding pipe in the reaction apparatus is not particularly limited. The catalyst feeding pipe can be arranged on the main reactor or at the bottom of the separator.

In an embodiment of the disclosure, the catalyst feeding pipe is arranged at a joint of the separator and the return pipe. The catalyst fed through the catalyst feeding pipe is also delivered to the main reactor through the return pipe.

The reaction apparatus of the disclosure further comprises a tail gas outlet. A fume barrier can be arranged in front of the tail gas outlet, thereby facilitating protection of a reaction medium from being discharged along with the tail gas.

In an embodiment of the disclosure, the apparatus comprises a tail gas outlet arranged at the side of the separator, and a fume barrier arranged in front of the tail gas outlet.

In an embodiment of the disclosure, the apparatus comprises a tail gas outlet arranged at the side of the main reactor, and a fume barrier arranged in front of the tail gas outlet.

Now specific embodiments of the disclosure will be described in detail with reference to the accompanying drawings.

Figure 1:
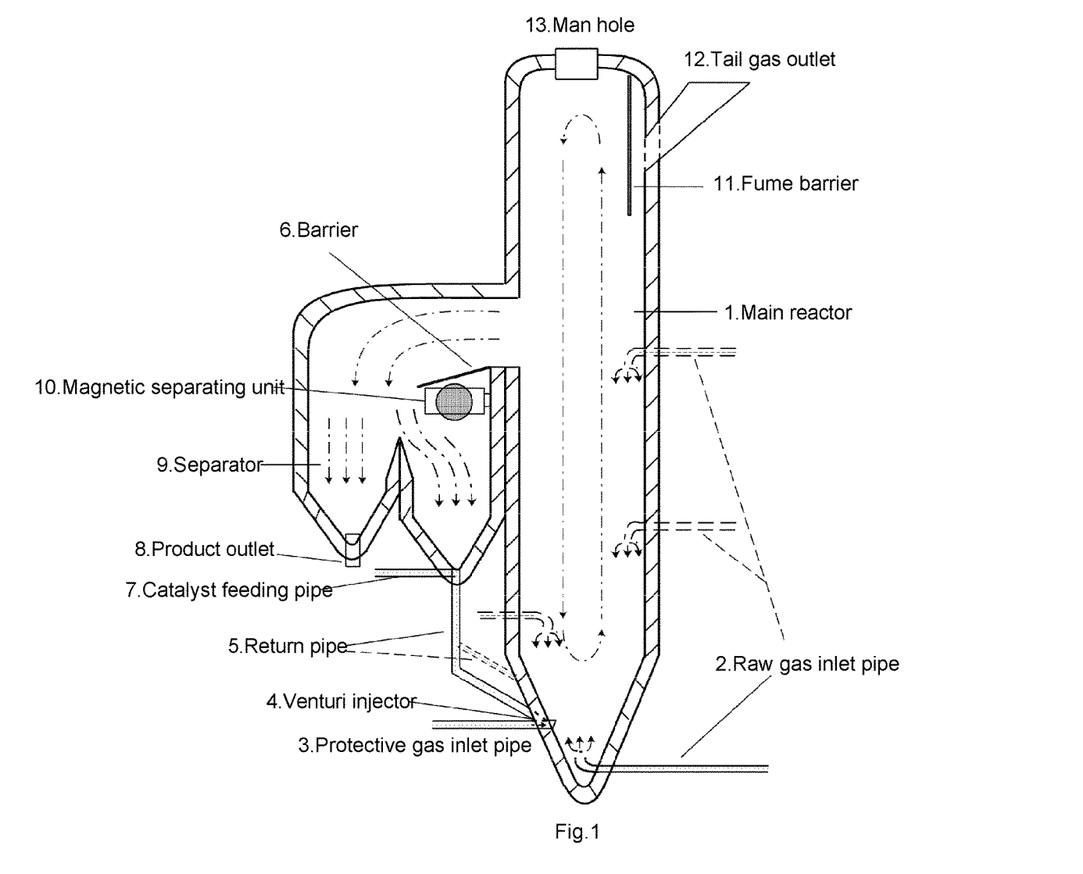
FIG. 1 is a schematic view showing a reaction apparatus comprising a Venturi injector as a feedback device according to an embodiment of the disclosure.

FIG. 1 is a schematic view showing a reaction apparatus comprising a Venturi injector as a feedback device according to a preferred embodiment of the disclosure.

The reaction apparatus shown in FIG. 1 comprises a main reactor 1 and a separator 9 in communication with the main reactor at ½ of the main reactor. A raw gas inlet pipe 2 and a protective gas inlet pipe 3 are arranged at a bottom of the main reactor 1. A magnetic separating unit 10 and a barrier 6 arranged above the magnetic separating unit are arranged inside the separator 9. A product outlet 8 and a return pipe 5 are arranged at a bottom of the separator 9. The separator 9 is communicated with the main reactor 1 through the return pipe 5. A catalyst feeding pipe 7 is arranged at a joint of the separator 9 and the return pipe 5. A Venturi injector 4 is arranged at a joint of the main reactor 1 and the protective gas inlet pipe 3. A tail gas outlet 12 is located at a side of a upper part of the main reactor 1. A fume barrier 11 is arranged in front of the tail gas outlet 12. A man hole 13 is arranged at the top of the main reactor.

When the reaction apparatus shown in FIG. 1 is operated, a raw gas passes through the raw gas inlet pipe 2 and enters the main reactor 1 from the raw gas inlet, and a carrier gas passes through the protective gas inlet pipe 3 and enters the main reactor 1 from the protective gas inlet. A catalyst is added through the catalyst feeding pipe 7. The catalyst passes through the return pipe 5 and enters the main reactor 1 from the return feed inlet by the action of the Venturi injector 4. The raw gas splits and grows into carbon nanotubes by the action of the catalyst. As the generated carbon nanotubes increase gradually, they are carried by the carrier gas into the separator 9 from the reaction material outlet. The material entering the separator moves in the separator along the barrier 6 to a side away from the main reactor. By the action of the magnetic separating unit 10, carbon nanotubes having a magnetic catalyst content of greater than 2.5% flow toward a material recycling port at the bottom of the separator along a path at a side proximal to the main reactor, while carbon nanotubes having a magnetic catalyst content of less than 2.5% flow toward a product outlet 8 at the bottom of the separator along a path at a side distal to the main reactor under gravity and are discharged out of the reaction apparatus from the product outlet 8. A tail gas passes by the fume barrier 11 and then is discharged from the tail gas outlet 12 at the upper part of the main reactor. By the action of the Venturi injector 4, carbon nanotubes having a magnetic catalyst content of greater than 2.5% and some gas are delivered through the return pipe 5 back to the main reactor for circulating reaction.

Figure 2:
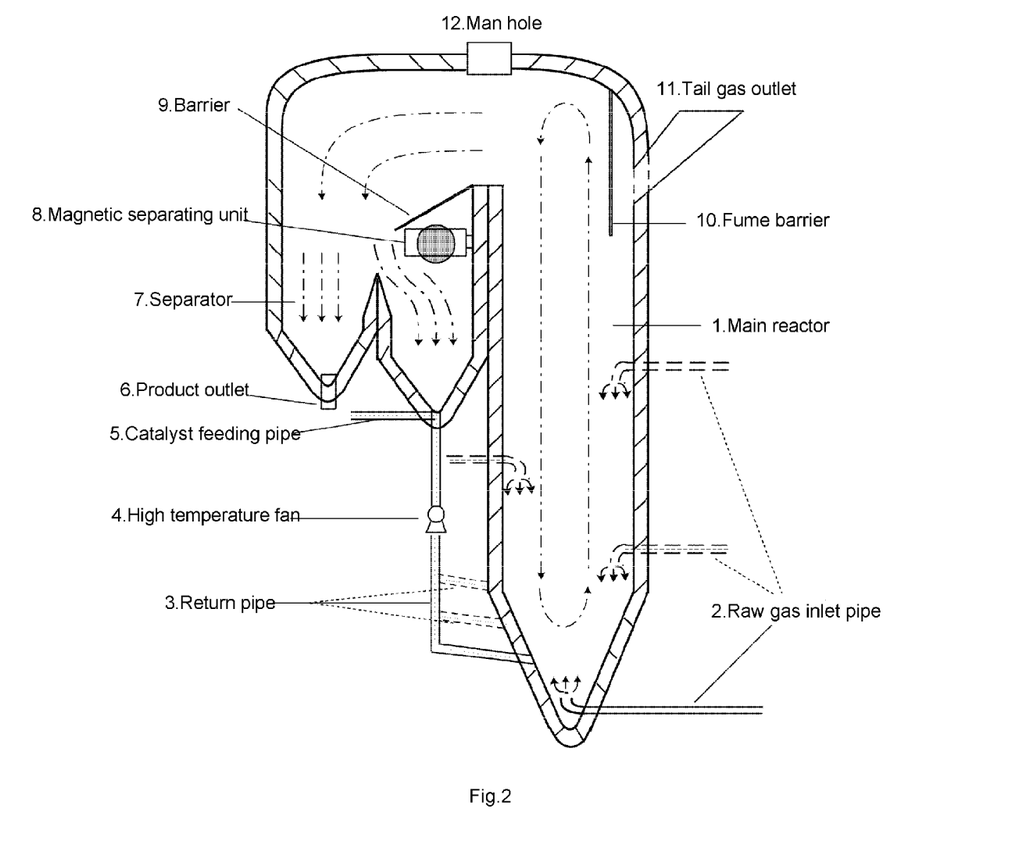
FIG. 2 is a schematic view showing a reaction apparatus comprising a high temperature fan as a feedback device according to another embodiment of the disclosure.

FIG. 2 is a schematic view showing a reaction apparatus comprising a high temperature fan as a feedback device according to a preferred embodiment of the disclosure.

The reaction apparatus shown in FIG. 2 comprises a main reactor 1 and a separator 7 in communication with a top of the main reactor. A raw gas inlet pipe 2 is arranged at a bottom of the main reactor 1. A magnetic separating unit 8 and a barrier 9 arranged above the magnetic separating unit are arranged inside the separator 7. A product outlet 6 and a return pipe 3 are arranged at a bottom of the separator 7. The separator 7 is communicated with the main reactor 1 through the return pipe 3. A high temperature fan 4 is arranged on the return pipe 3. A catalyst feeding pipe 5 is arranged at a joint of the separator 7 and the return pipe 3. A tail gas outlet 11 is located at the side of the separator 7. A fume barrier 10 is arranged in front of the tail gas outlet 11. A man hole 12 is arranged at the top of the main reactor.

When the reaction apparatus shown in FIG. 2 is operated, both a raw gas and a carrier gas pass through the raw gas inlet pipe 2 and enter the main reactor 1 from the raw gas inlet. A catalyst is added through the catalyst feeding pipe 5. The catalyst passes through the return pipe 3 and enters the main reactor 1 from the return feed inlet by the action of the high temperature fan 4. The raw gas splits and grows into carbon nanotubes by the action of the catalyst. As the generated carbon nanotubes increase gradually, they are carried by the carrier gas into the separator 7 from the reaction material outlet. The material entering the separator moves in the separator along the barrier 9 to a side distal to the main reactor. By the action of the magnetic separating unit 8, carbon nanotubes having a magnetic catalyst content of greater than 2.5% flow toward a material recycling port at a bottom of the separator along a path at a side proximal to the main reactor, while carbon nanotubes having a magnetic catalyst content of less than 2.5% flow toward a product outlet 6 at the bottom of the separator along a path at a side distal to the main reactor under gravity and are discharged out of the reaction apparatus from the product outlet 6. A tail gas passes by the fume barrier 10 and then is discharged from the tail gas outlet 11 at the upper part of the main reactor. By the action of the high temperature fan 4, carbon nanotubes having a magnetic catalyst content of greater than 2.5% and some gas are delivered through the return pipe and the return feed inlet back to the main reactor for circulating reaction.

Figure 3:
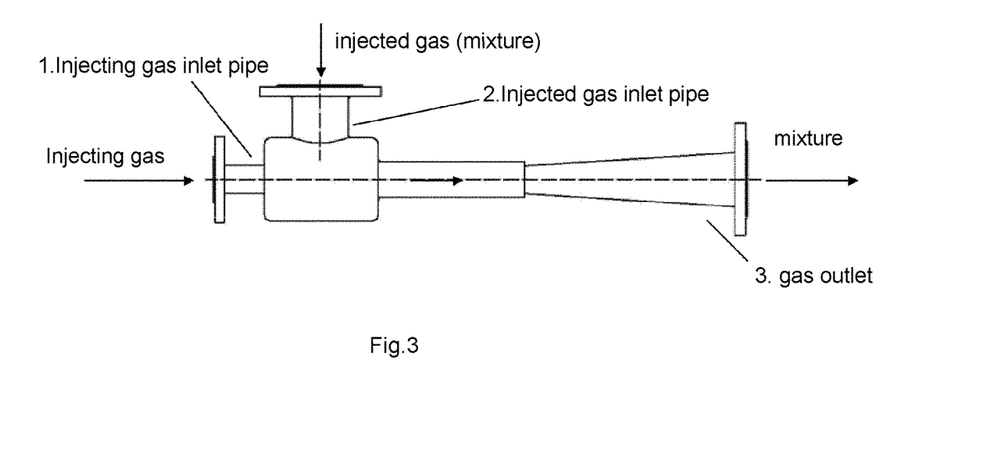
FIG. 3 is a schematic view showing a Venturi injector included in a preferred embodiment of the disclosure.

FIG. 3 is a schematic view showing a Venturi injector used in a preferred embodiment of the disclosure.

The Venturi injector shown in FIG. 3 comprises an injecting gas inlet pipe 1, an injected gas inlet pipe 2 and a gas outlet 3, wherein the injecting gas inlet pipe 1 has a pipe diameter of 15-200 mm, the injecting gas has a flow rate of 0.5-300 m/s; the injected gas inlet pipe 2 has a pipe diameter of 15-200 mm, and the injected gas has a flow rate of 0.5-200 m/s.

When used in the reaction apparatus of the disclosure, the injecting gas inlet pipe and the protective gas inlet pipe of the reaction apparatus are connected, and the injected gas inlet pipe and the return pipe are connected. When the Venturi injector shown in FIG. 3 is used, an injecting gas (i.e. a protective gas) enters the main reactor from the protective gas inlet pipe through the injecting gas inlet pipe 1, and the injected gas is introduced from the return pipe through the injected gas inlet pipe 2 and finally enters the main reactor.

In a preferred example of the disclosure, the apparatus for continuous preparation of carbon nanotubes comprises a main reactor 1, a raw gas inlet pipe 2, a protective gas inlet pipe 3, a Venturi injector 4, a return pipe 5, a barrier 6, a catalyst feeding pipe 7, a product outlet 8, a separator 9, a magnetic separating unit 10, a fume barrier 11, a tail gas outlet 12, and a man hole 13. The main reactor is a fluidized bed. The separator 9 is communicated with the middle of the main reactor 1. The magnetic separating unit 10 is arranged inside the separator, and the bottom of the separator is connected to the product outlet 8 and the return pipe 5 respectively, wherein the return pipe is communicated with the main reactor 1 via the Venturi injector 4, so that a communication state of the reaction apparatus is realized. The raw gas inlet pipe 2 is located at a side of the bottom of the main reactor 1. The Venturi injector 4 is arranged at the joint of the return pipe 5 and the main reactor 1. The raw gas inlet, the return feed inlet and the protective gas inlet are arranged at a plurality of levels inside the main reactor and at a plurality of points at the same level, thereby facilitating fluidized reaction and heat conduction. The tail gas outlet 12 is arranged at a side of the main reactor 1, wherein a fume barrier 11 is arranged in front of the tail gas outlet to protect a reaction medium from being discharged along with the tail gas. The man hole 13 is arranged at a top of the reaction apparatus to facilitate observation and maintenance. The magnetic separating unit is used to separate high purity carbon nanotubes having a magnetic catalyst content of less than 2.5% from incompletely reacted carbon nanotubes having a magnetic catalyst content of greater than 2.5%. The carbon nanotubes having a magnetic catalyst content of less than 2.5% are discharged from the product outlet 8, while the carbon nanotube material having a magnetic catalyst content of greater than 2.5% is fed by the Venturi injection principle to the main reactor again for reaction. A catalyst is fed through the catalyst feeding pipe 7, and enters the main reactor for reaction through the return pipe by the action of injection.

A method for continuous preparation of carbon nanotubes using the apparatus of the disclosure comprises:

1) providing a carbon source and a magnetic catalyst in a fluidized state to a main reactor, wherein the carbon source is split into carbon nanotubes by the action of the magnetic catalyst at a temperature of 600-1000° C.;

2) separating carbon nanotubes having a magnetic catalyst content of greater than 2.5% from carbon nanotubes having a magnetic catalyst content of less than 2.5% with a magnetic separating unit in a separator, wherein the magnetic catalyst content is based on the weight of carbon nanotubes formed; and 3) delivering the separated carbon nanotubes having a magnetic catalyst content of greater than 2.5% back to the main reactor through a feedback device on a return pipe to continue catalytic growth of carbon nanotubes.

Now the method for continuous preparation of carbon nanotubes will be described:

(1) Providing a Carbon Source and a Magnetic Catalyst in a Fluidized State, Wherein the Carbon Source is Split into Carbon Nanotubes by the Action of the Magnetic Catalyst In an example of the disclosure, the carbon source and the catalyst are dispersed in a fluidized protective gas to form a carbon source and a catalyst in a fluidized state.

In the disclosure, the term "protective gas" means a gas that will not interfere with the reaction of the carbon source and the catalyst, non-limiting examples of which include, for example, nitrogen gas, helium gas, argon gas, etc.

In another example of the disclosure, the carbon source and the catalyst are mixed, followed by application of heat and a driving force to disperse the catalyst in a flowing vapor of the carbon source, so as to form a carbon source and a catalyst in a fluidized state.

In the above example of the disclosure, the driving force is used to provide the fluidized state, wherein the form of the driving force includes carrying by a carrier gas, rotation driving force or differential pressure driving force, and other forms of driving force. Carrying by a carrier gas involves carrying of a reactant by a protective gas such as nitrogen gas, argon gas and the like.

In an example of the disclosure, a protective gas (e.g. nitrogen gas) is used in a fluidized bed reactor to carry a carbon source and blow a catalyst into a suspension state, thereby providing a carbon source and a catalyst in a fluidized state.

In the disclosure, the term "carbon nanotube" means a one-dimensional quantum material having a special structure, wherein it has a radial size on the order of nanometer scale, and an axial size on the order of micrometer scale. A carbon nanotube substantially consists of several to tens of layers of co-axial cylindrical tubes made of carbon atoms arranged hexagonally. A constant distance of about 0.34 nm is maintained between layers, and the diameter is generally 2-20 nm.

Reactions for preparation of carbon nanotubes from a carbon source in the presence of a catalyst are known in the art.

The carbon source suitable for the method of the disclosure is not particularly limited, and may be a low carbon hydrocarbon containing 7 carbon atoms or less or a heavy carbon source such as anthracene oil and waste tyre oil, wherein the anthracene oil is a part of a coal tar composition and comprises anthracene, phenanthrene, acenaphthene and the like as main components; and the waste tyre oil is a fuel oil manufactured by hydrolysis of waste tyres, and comprises unsaturated hydrocarbons and benzene series as the main components.

The catalyst suitable for the method of the disclosure is a catalyst containing iron, cobalt, nickel or a transition metal commonly used in production of carbon nanotubes, for example, a $Fe_2O_3/Al_2O_3$ catalyst, among others, which comprises a magnetic substance such as iron and the like. "Red mud" is a residue generated in production of aluminium oxide from bauxite. It's a red muddy waste, also named "red sludge". Red mud is rich in oxides of Fe, Al and Ca as well as small amounts of other components such as titanium oxides. These components happen to be active components for catalytic growth of carbon nanotubes. Hence, red mud can also be used as a catalyst for carbon nanotubes.

In an embodiment of the disclosure, based on the total weight of the catalyst, the catalyst has a content of magnetic substances of iron, cobalt, nickel and the like of 1-50 wt %, preferably 2-40 wt %, more preferably 5-40 wt %.

In an example of the disclosure, the carbon source is propylene, and the catalyst is a $Fe_2O_3/Al_2O_3$ catalyst which has an iron content of 38 wt % based on the total weight of the catalyst.

In another example of the disclosure, the carbon source is waste tyre oil, and the catalyst is a $Fe_2O_3/Al_2O_3$ catalyst which has an iron content of 38 wt % based on the total weight of the catalyst.

In another example of the disclosure, the carbon source is anthracene oil, and the catalyst is red mud which has an iron content of 36.69% based on the total weight of the catalyst.

In an example of the disclosure, the carbon source is split into carbon nanotubes in the presence of a catalyst at a temperature of 500-1000° C., preferably 600-900° C., more preferably 650-800° C.

Methods for providing a carbon source and a catalyst for the disclosure are not particularly limited, and they can be any conventional methods known in the art.

(2) A Magnetic Separating Unit Separates Carbon Nanotubes Having a Magnetic Catalyst Content of Greater than X from Carbon Nanotubes Having a Magnetic Catalyst Content of Less than X, wherein X is any Value in a Range of 0.5%-3%, Wherein the Magnetic Catalyst Content is Based on the Weight of Carbon Nanotubes Formed.

A catalyst used for production of carbon nanotubes comprises a magnetic substance such as iron and the like. The content of the magnetic substance such as iron and the like is relatively high in carbon nanotubes of which catalytic growth is not full, while the content of the magnetic substance is very low in carbon nanotubes which react fully. Therefore, a magnetic separating unit is used in the disclosure to separate carbon nanotubes having a magnetic catalyst content of less than a particular value X from carbon nanotubes having a magnetic catalyst content of greater than a particular value X, wherein X is any value in a range of 0.5%-3%, wherein the magnetic catalyst content is based on the weight of carbon nanotubes formed.

A barrier located above the magnetic separating unit allows a reaction material entering the separator to flow along a side of the separator toward a bottom of the separator. When the reaction material flows by the side of the magnetic separating unit, the magnetic attraction applied by the magnetic separating unit deflects the flowing direction of a material having a high content of a magnetic substance (including carbon nanotubes having a high catalyst content), while a flow of carbon nanotubes having a low content of the magnetic substance is not affected, and discharged from a product outlet at the bottom of the separator.

(3) Delivering the Separated Carbon Nanotubes Having a Magnetic Catalyst Content of Greater than X Back to the Main Reactor Through a Feedback Device to Continue Catalytic Growth of Carbon Nanotubes.

A material reacted incompletely is fed to the main reactor again for reaction through the feedback device on a return pipe. The unreacted material comprises carbon nanotubes having a high magnetic catalyst content and unreacted carbon source gas, and is delivered to the main reactor again through the feedback device via the return pipe.

In the disclosure, feedback of a material can be fulfilled by Venturi injection. The Venturi injection principle means that, when a fluid flows at a high speed, it drags a fluid surrounding it to flow together due to its faster speed compared with the surrounding fluid, and a pressure variation surrounding the high speed fluid produces a draining effect for the surrounding fluid.

According to the disclosure, the feedback of the material can also be fulfilled by a high temperature fan, a high temperature compressor or the like arranged on the return pipe, which delivers carbon nanotubes having a high magnetic catalyst content and unreacted gas in the separator to the main reactor again for reaction.

In another embodiment of the disclosure, a carrier gas introduced in through a protective gas inlet has a flow rate of 0.5-300 m/s, preferably 5.0-200 m/s, more preferably 10-100 m/s; and a gas introduced in through a raw gas inlet has a flow rate of 0.2-300 m/s, preferably 1.0-200 m/s, more preferably 10-100 m/s.

In a preferred example of the disclosure, the method for continuous preparation of carbon nanotubes using the reaction apparatus of the disclosure comprises the following specific steps:

1) feeding $N_2$ into a main reactor through a protective gas inlet pipe for 20-60 min, and heating the main reactor to a temperature of 600-1000° C. at which a catalyst is fed through a catalyst feeding pipe and delivered to the main reactor via a return pipe by the action of injection;

2) gasifying a carbon source under the protection of nitrogen gas at 300-1000° C., and delivering a mixture of the gasified carbon source and the nitrogen gas to the main reactor through a raw gas inlet pipe to blow the catalyst into a state of fluidized suspension, wherein the gas and solid phases are in full contact, and the carbon source gas adheres to the catalyst surface and splits gradually to form carbon nanotubes;

3) separating carbon nanotubes having a low magnetic catalyst content from carbon nanotubes having a high magnetic catalyst content using a magnetic separating unit after an increasing number of carbon nanotubes are formed after a period of reaction, while the solid material has an increasing volume and enters a separator, at which time solid particles in the material settle naturally under gravity and by the carrying action of the flowing gas, wherein the carbon nanotubes having a low magnetic catalyst content are collected from a product outlet, and the separated carbon nanotubes having a high magnetic catalyst content and some gas are delivered to the main reactor again for reaction by the Venturi injection principle to increase the utility of the catalyst and the carbon source, wherein a fume is discharged out of the reactor through a tail gas outlet at a side of the main reactor after separation; and 4) repeating steps 1, 2, 3 for continuous production of carbon nanotubes.

In a preferred example of the disclosure, nitrogen gas introduced into the protective gas inlet pipe has a flow rate of 0.5-300 m/s, preferably 5.0-200 m/s, more preferably 10-100 m/s; the gas mixture entering the main reactor has a volumetric ratio of nitrogen:carbon source gas=1:1-1:2; the gas mixture introduced in from the raw gas inlet has a flow rate of 0.2-300 m/s, preferably 1.0-200 m/s, more preferably 10-100 m/s; the reaction time is 30 min-1.5 h; and the gas in the fluidized bed has a flow rate of 0.01-10 m/s; preferably 0.05-5 m/s; more preferably 0.1-3 m/s.

The beneficial effects of the disclosure include:

(1) The reaction apparatus is adaptive to a wide range of carbon sources, including low carbon hydrocarbons containing 7 carbon atoms or less and heavy carbon sources in the form of anthracene oil and waste tyre oil;

(2) The magnetic separating unit in the reaction apparatus separates carbon nanotubes from materials not fully reacted, so that the carbon nanotubes obtained have a high purity, and the ash content is less than 2.5%;

(3) The separated catalyst and some gas can be delivered to the main reactor again for reaction by means of a Venturi injector, a high temperature fan, a high temperature compressor and the like, so as to increase the utility of the carbon source and the catalyst significantly;

(4) Distribution of the catalyst and the nanocarbon material in the reactor and their fluidized state can be controlled by control of the flow rate of the gas, and continuous operation can be realized; and (5) The apparatus has a simple structure, and the method can be performed easily, suitable for large-scale industrial production.

The disclosure will be further illustrated with reference to the following specific Examples. It's to be understood that these Examples are only intended to demonstrate the disclosure without limiting the scope of the disclosure. The experimental methods in the following examples for which no specific conditions are indicated will be carried out generally under conventional conditions or under those conditions suggested by the manufacturers. Unless stated otherwise particularly, ratios and percentages are based on moles.

Raw Material Sources and Preparation:

(1) Carbon Sources

Propylene: available from Shandong Qilu Petrochemical Company, purity: >99.9%;

Anthracene oil: available from Shandong Tiexiong Energy Coal Chemical Company;

Waste tyre oil: available from Zibo Hexuan Chemical Equipments Company.

(2) Catalyst $Fe_2O_3/Al_2O_3$ catalyst (mass percentage of Fe: 38%): prepared by compounding $Fe_2O_3$ and $Al_2O_3$ at a ratio followed by calcination at high temperature;

Red mud: available from Shandong Weiqiao Pioneering Group Co., used as a catalyst after high temperature pre-treatment, pulverization and sifting.

Tests for Product Properties:

(1) Ash Test:

Ash in the carbon nanotubes was determined according to National Standard GB/T 3780.10-2009. The main component of the ash is the magnetic catalyst which cannot be burned off in the test. Determination of ash may be used to determine the content of the carbon phase in a product, and thus characterize the purity of the carbon nanotubes indirectly.

(2) Specific Surface Area Test:

The specific surface areas of the products were determined using a $N_2$ physical adsorption analyzer according to National Standard GB/T 10722;

(3) Micromorphology Test:

The outer diameters and lengths of the carbon nanotubes were determined by Scanning Electron Microscopy (SEM) and Transmission Electron Microscopy (TEM).

Example 1

Based on the reaction apparatus shown in FIG. 1, the carbon source was propylene, and the catalyst was a $Fe_2O_3$/$Al_2O_3$ catalyst (mass percentage of Fe: 38%). $N_2$ was fed into the main reactor 1 through the protective gas inlet pipe 3 at a flow rate of 8.0 m/s for 60 min. The temperature of the main reactor 1 was raised to 700° C. at which the catalyst was delivered to the main reactor 1 through the return pipe 5 from the catalyst feeding pipe 7.

The carbon source was gasified under the protection of nitrogen gas at 600° C., and the gas mixture produced after gasification was delivered through the raw gas inlet pipe 2 to the main reactor 1 for reaction, wherein the ratio of $N_2$:propylene in the gas mixture was 1:0.5, and the flow rate of the gas mixture at the inlet was 25 m/s. The carbon source gas adhered to the catalyst surface and split gradually to form carbon nanotubes.

After reaction for 40 min, the carbon nanotubes entered the separator 9 sequentially. The magnetic separating unit 10 separated the carbon nanotubes from the catalyst that was not utilized fully. The carbon nanotubes were collected from the product outlet 8, and the separated carbon nanotubes having a magnetic catalyst content of greater than 2% and some gas were delivered to the main reactor 1 again for reaction by the Venturi injection principle, so as to increase the utility of the catalyst and the carbon source. The fume was discharged out of the reactor through the tail gas outlet 12 at a side of the main reactor after separation.

The carbon nanotube product thus obtained had the following parameters and properties: ash <1.8%, outer diameter 8-15 nm, length 3-15 μm, specific surface area >200 $m^2$/g, black, bulk density 0.10 $g/cm^3$. The test results verified that the catalyst content in the carbon nanotubes collected from the product outlet was less than 1.8%.

The above steps were performed continually for continuous production of multi-walled carbon nanotubes.

Example 2

Based on the reaction apparatus shown in FIG. 1, the carbon source was waste tyre oil, and the catalyst was a $Fe_2O_3$/$Al_2O_3$ catalyst (mass percentage of Fe: 38%). $N_2$ was fed into the main reactor 1 through the protective gas inlet pipe 3 at a flow rate of 8.0 m/s for 40 min. The temperature of the main reactor 1 was raised to 800° C. at which the catalyst was delivered to the main reactor 1 through the return pipe 5 from the catalyst feeding pipe 7.

The carbon source was gasified under the protection of nitrogen gas at 450° C., and the gas mixture produced after gasification was delivered through the raw gas inlet pipe 2 to the main reactor 1 for reaction, wherein the ratio of $N_2$:waste tyre oil in the gas mixture was 1:0.8, and the flow rate of the gas mixture at the inlet was 20 m/s. The carbon source gas adhered to the catalyst surface and split gradually to form carbon nanotubes.

After reaction for 1.0 h, the carbon nanotubes entered the separator 9 sequentially. The magnetic separating unit 10 separated the carbon nanotubes from the catalyst that was not utilized fully. The carbon nanotubes were collected from the product outlet 8, and the separated carbon nanotube particles having a magnetic catalyst content of greater than 2% and some gas were delivered to the main reactor 1 again for reaction by the Venturi injection principle, so as to increase the utility of the catalyst and the carbon source. The fume was discharged out of the reactor through the tail gas outlet 12 at a side of the main reactor after separation.

The carbon nanotube product thus obtained had the following parameters and properties: ash <2.0%, outer diameter 10-15 nm, length 5-15 μm, specific surface area >180 $m^2$/g, black, bulk density 0.12 $g/cm^3$. The test results verified that the catalyst content in the carbon nanotubes collected from the product outlet was less than 2.0%.

The above steps were performed continually for continuous production of multi-walled carbon nanotubes.

Example 3

Based on the reaction apparatus shown in FIG. 2, the carbon source was anthracene oil, and red mud was used as the catalyst. The red mud used was the residue generated in production of aluminum oxide by the Bayer process, wherein the TFe (total iron) content was 36.69%. The red mud was baked at 102° C. for 4 h, and then pulverized. The pulverized red mud was sifted through a 200 mesh sieve for use. $N_2$ was fed into the main reactor 1 through the raw gas inlet pipe 2 at a flow rate of 10 m/s for 30 min. The temperature of the main reactor 1 was raised to 600° C. at which the red mud catalyst was added from the catalyst feeding pipe 5, and delivered to the main reactor 1 through the return pipe 3 by the action of the high temperature fan 4.

The carbon source was gasified under the protection of nitrogen gas at 500° C., and the gas mixture produced after gasification was delivered through the raw gas inlet pipe 2 to the main reactor 1 for reaction, wherein the ratio of $N_2$:anthracene oil in the gas mixture was 1:1, and the flow rate of the gas mixture at the inlet was 15 m/s. The carbon source gas adhered to the catalyst surface and split gradually to form carbon nanotubes.

After reaction for 1.5 h, the carbon nanotubes entered the separator 7 sequentially. The magnetic separating unit 8 separated the carbon nanotubes from the catalyst that was not utilized fully. The carbon nanotubes were collected from the product outlet 6, and the separated carbon nanotube particles having a catalyst content of greater than 2.5% and some gas were delivered by the high temperature fan 4 to the main reactor 1 again for reaction, so as to increase the utility of the catalyst and the carbon source. The fume was discharged out of the reactor through a tail gas outlet 11 at a side of the separator after separation.

The carbon nanotube product thus obtained had the following parameters and properties: ash <2.5%, outer diameter 8-15 nm, length 5-20 μm, specific surface area >170 $m^2$/g, black, bulk density 0.13 $g/cm^3$. The test results verified that the catalyst content in the carbon nanotubes collected from the product outlet was less than 2.5%.

The above steps were performed continually for continuous production of multi-walled carbon nanotubes.

The carbon nanotubes prepared according to the method of the disclosure have an ash content of less than 2.5%, and thus may be used for electroconductive materials, electromagnetic shielding, solar energy batteries, the rubber field, improvement of dynamic performances of composite materials, etc. As seen from the Examples of the disclosure, the use of the reaction apparatus of the disclosure allows for continuous preparation of carbon nanotubes. The method for preparation of carbon nanotubes using this reaction apparatus is characterized by simple operation, high utility of catalyst and carbon source, high purity of carbon nanotubes thus obtained, low ash content, and superior properties. It satisfies the requirements of commercial application, suitable for large-scale industrial production.

For the process method for continuous preparation of carbon nanotubes according to the disclosure, the amounts and proportions of the raw materials and the process parameters are not limited by the Examples provided above. Various changes or modifications to the disclosure can be made by those skilled in the art after reading the above teachings of the disclosure, and these equivalent variations fall in the scope defined by the accompanying claims of the application as well.

What is claimed is:

1. A method for continuous preparation of carbon nanotubes using an apparatus for continuous preparation of carbon nanotubes, wherein the apparatus comprises a main reactor, with a raw gas inlet, a return feed inlet, a protective gas inlet and a reaction material outlet;
   a separator in fluid communication with the reaction material outlet of the main reactor at a top of the separator, where a magnetic separating device is arranged in the top of the separator at a side proximal to the main reactor, where a product outlet and a material recycling port are arranged at a bottom of the separator respectively, where the product outlet is located at a side distal to the main reactor, and the recycling port is located at a side proximal to the main reactor;
   a return pipe and a feedback device arranged on the return pipe, where one end of the return pipe is fluid communicated with the material recycling port of the separator, and the other end is fluid communicated with the return feed inlet of the main reactor; and
   where the apparatus further comprises a tail gas outlet, and wherein the method comprises:
      providing a carbon source and a magnetic catalyst in a fluidized state to a main reactor, where the carbon source is split into carbon nanotubes by the action of the magnetic catalyst at a temperature of 600-1000° C.;
      separating carbon nanotubes having a magnetic catalyst content of greater than X from carbon nanotubes having a magnetic catalyst content of less than X with a magnetic separating unit in a separator, where X is any value in a range of 0.5%-3%, where the magnetic catalyst content is based on the weight of carbon nanotubes formed; and
      delivering the separated carbon nanotubes having a magnetic catalyst content of greater than X back to the main reactor through a feedback device on a return pipe to continue catalytic growth of carbon nanotubes.

2. The method of claim 1, wherein the magnetic catalyst is a catalyst containing at least one from the group consisting of iron, cobalt, nickel, and a transition metal, where the catalyst has a total content of at least one from the group consisting of iron, cobalt, nickel, and a transition metal of 1-50 wt % based on the total weight of the catalyst.

3. The method of claim 1, wherein a carrier gas introduced in through a protective gas inlet has a flow rate of 0.5-300 m/s
   a gas introduced in through a raw gas inlet of the main reactor has a flow rate of 0.2-300 m/s; and
   a gas in a fluidized bed has a flow rate of 0.01-10 m/s.

4. An apparatus used for a method for continuous preparation of carbon nanotubes comprising:
   a main reactor, with a raw gas inlet, a return feed inlet, a protective gas inlet and a reaction material outlet;
   a separator disposed adjacent to the main reactor and in fluid communication with the reaction material outlet of the main reactor at a top of the separator, where a magnetic separating device is disposed adjacent to the main reactor and in the top of the separator, where a product outlet and a material recycling port are arranged at a bottom of the separator respectively, where the product outlet is located at a side distal to the main reactor, where the recycling port is located at a side proximal to the main reactor, and where the top of the separator is in fluid communication with the reaction material outlet of the main reactor at a position between $1/3$ of the main reactor from the bottom and the top of the main reactor;
   a return pipe and a feedback device arranged on the return pipe, where one end of the return pipe is fluid communicated with the material recycling port of the separator, and the other end is fluid communicated with the return feed inlet of the main reactor; and
   where the apparatus further comprises a tail gas outlet.

5. The apparatus of claim 4, wherein the top of the separator is in fluid communication with the reaction material outlet of the main reactor at a position between $1/2$ of the main reactor from the bottom and the top of the main reactor.

6. The apparatus of claim 4, wherein the main reactor is a fluidized bed reactor.

7. The apparatus of claim 4, wherein the feedback device is selected from at least one from the group consisting of a Venturi injector, a high temperature fan, and a high temperature compressor.

8. The apparatus of claim 7, wherein the Venturi injector is arranged from at least one of the group consisting of the joint of the return pipe and the main reactor, on the return pipe outside of the main reactor, and inside the main reactor.

9. The apparatus of claim 4, wherein at least one from the group consisting of the raw gas inlet, the return feed inlet and the protective gas inlet are arranged at a plurality of levels inside at least one from the group consisting of the main reactor and at a plurality of points at the same level.

10. The apparatus of claim 4, wherein the protective gas inlet and the raw gas inlet are arranged from at least one from the group consisting of separately and combined for feeding.

* * * * *